United States Patent Office 3,776,970
Patented Dec. 4, 1973

3,776,970
PROCESS FOR THE SEPARATION OF STYRENE FROM ETHYLBENZENE
William F. Strazik, Wilbraham, Mass., and Eli Perry, St. Louis, Mo., assignors to Monsanto Company, St. Louis, Mo.
No Drawing. Filed Dec. 14, 1972, Ser. No. 315,266
Int. Cl. C07c 7/02
U.S. Cl. 260—669 A
6 Claims

ABSTRACT OF THE DISCLOSURE

Styrene is separated from organic mixtures comprising styrene and ethylbenzene by contacting the mixture (feed mixture) against one side of a polyurethane elastomer membrane under pervaporation permeation conditions and withdrawing at the other side a vaporous mixture having increased styrene concentration. The polyurethane elastomer employed contains polyether or polyester groupings. Examples of polyurethane elastomer polymers are polymers of the formula

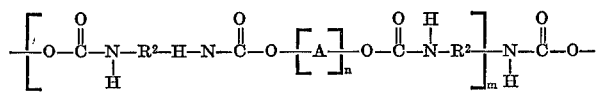

wherein R, R$^1$, R$^2$ and R$^3$ are divalent organic radicals, R$^4$ is hydrogen or an organic radical, A is

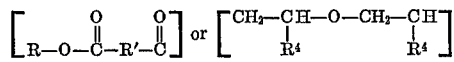

$n$ is an integer in the range of 3–500 and $m$ is an integer indicating the degree of polymerization.

BACKGROUND OF THE INVENTION

Field of the invention

This invention relates to a process for separating styrene from organic mixtures containing same. In a particular aspect this invention relates to a process for the separation of styrene from organic mixtures comprising styrene and ethylbenzene by preferential permeation through a polymer membrane under pervaporation conditions. In a more particular aspect this invention relates to a process for the separation of styrene from organic mixtures comprising styrene and ethylbenzene by contacting the said mixture under pervaporation permeation conditions against one side of a polyurethane elastomer membrane, said polyurethane elastomer containing groupings selected from the group consisting of polyester and polyether and recovering on the other side a vaporous mixture rich in styrene.

Description of the prior art

Separation of monoalkenes such as styrene from organic mixtures such as mixtures of styrene and ethylbenzene has been accomplished by distillation procedures. Separation of azeotropic mixtures of organic materials such as mixtures of styrene and 2-chloroethanol and mixtures of ethylbenzene and 2-chloroethanol by membrane permeation through certain polymer membranes followed by distillation is also known to the art, for example from U.S. Pat. 2,953,502 issued Sept. 20, 1960 to R. C. Binning and Robert J. Lee.

SUMMARY OF THE INVENTION

It has been discovered in accordnace with the present invention that styrene is effectively separated from organic mixtures comprising styrene and ethylbenzene by contacting the mixture under pervaporation permeation conditions against one side of a polyurethane elastomer membrane, said membrane containing a grouping selected from the group consisting of polyester and polyether, and withdrawing from the second side of the membrane a vaporous mixture having a higher concentration of styrene than the aforesaid mixture. Polyurethane elastomer membranes employed in the process of the present invention are highly efficient in separating styrene from ethylbenzene using pervaporation separation techniques. The present invention is further advantageous in that it permits avoidance of costly distillation procedures.

DETAILED DESCRIPTION

The process of the present invention comprises contacting an organic feed mixture comprising styrene and ethylbenzene against one side of a polyurethane elastomer permeation membrane and withdrawing at the second side a mixture having a higher concentration of the preferentially permeable alkene than in the aforesaid feed mixture. It is essential that the mixture at the second side be maintained at a lower chemical potential than the mixture on the feed side. It is also essential that the product

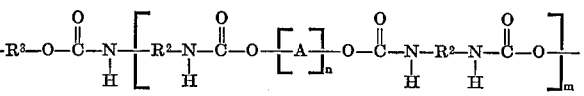

be withdrawn at the second side in the vapor state. In the commercial utilization of the process multistage operation is feasible since this permits the operation of individual stages at various concentrations and temperatures in order to achieve the optimum driving force for the process.

For each individual stage the effectiveness of the separation is shown by the separation factor (S.F.). The separation factor (S.F.) is defined as the ratio of the concentrations of two substances, A and B, to be separated, divided into the ratio of the concentrations of the corresponding substances in the permeate $$S.F. = \frac{(C_A/C_B) \text{ in permeate}}{(C_A/C_B) \text{ in permeant}}$$

where $C_A$ and $C_B$ are the concentration of the preferentially permeable component and any other component of the mixture or the sum of other components respectively.

In carrying out the process of the present invention, the first or feed side of the membrane is such that the activities of the components are greater than the activities on the second side of the membrane. Preferably, the first side is above atmospheric pressure and the second side below atmospheric pressure. Still more preferably, the second side is maintained such that the pressure differential is greater than 0.01 atmosphere. A further preferred mode of operation is with the second side maintained at a vacuum of greater than 0.2 mm. Hg.

The term "Chemical Potential" is employed herein as described by Olaf A. Hougen and K. M. Watson ("Chemical Process Principles, Part II," John Wiley, New York, 1947). It is related to the escaping tendency of a substance from any particular phase. For an ideal vapor or gas, this escaping tendency is equal to the partial pressure so that it varies greatly with changes in the total pressure. For a liquid, change in escaping tendency as a function of total pressure is small. The escaping tendency always depends upon the temperature and concentration. In the present invention, the feed substance is typically a liquid solution and the other side of the membrane is maintained such that a vapor phase exists. A vapor feed may be employed when the mixture to be separated is available in that form from an industrial process or when heat ceonomies are to be effected in multi-stage process.

The feed side may be at pressures less than atmospheric, but preferably greater than atmospheric, and also at pressure over and above the vapor pressure of the liquid components. The collection or permeate vapor side of the membrane is preferably less than atmospheric pressure, but under proper feed side conditions, also may be greater than atmospheric pressure. The total pressure on the feed side is preferably between 0 p.s.i. absolute and 5,000 p.s.i.g. The conditions are always such as to maintain a higher chemical potential on the feed side than on the collection or vapor side.

The temperatures on the feed side and the collection side may vary over a wide range. However, temperatures should be avoided which cause substantial decomposition of any of the organic materials in the mixture or of the membrane, and which cause the vapor pressure on the collection side of any of the permeated materials to be exceeded by the pressure being maintained on that side. Typically, an increase in temperature causes an increase in permeation rate.

In accordance with the present invention, separations are carried out for removal of the preferentially permeable styrene through the membrane with the said alkene in a higher concentration than in the feed being recovered from the collection side of the membrane as a vapor with the imposition of a state of lower chemical potential on such collection side of the membrane. For example, a mixture of styrene and ethylbenzene may be applied to one side of a flat diaphragm or membrane to accomplish removal of at least a part of the styrene leaving a more highly concentrated ethylbenzene solution on the feed side of the membrane. A state of lower chemical potential is maintained on the collection or downstream side of the membrane by vacuum e.g. from 0.1 mm. Hg to the vapor pressure of the organic component of the mixture which has the lowest vapor pressure at the membrane at the respective temperature as long as the vapor phase is present on the downstream side. In the system referred to above, the styrene selectively passes through the membrane with the styrene-rich composition being removed rapidly as vapor from the collection side of the membrane.

In contrast to the present invention the employment of permeates in liquid phase on the second side of the membrane is impractical because the applied pressure has been found to be prohibitively high e.g. up to 1,000 atmospheres being necessary because of osmotic pressure. Liquid-liquid permeation is largely an equilibrium phenomenon unless the osmotic forces are overcome while in contrast liquid-vapor or vapor-vapor separations are accordingly much more effectively carried out than liquid-liquid separations.

The polymeric permeation membrane employed in the process of the present invention is a polyurethane elastomer membrane, the polyurethane elastomer having groupings selected from groups consisting of polyester and polyether. Such polyurethane elastomers are known to the art for example, from J. H. Saunders and K. C. Frisch "Polyurethanes, Chemistry and Technology" Part I. Chemistry, Interscience Publishers (1962). The polymers are typically of high molecular weight for example on the order of from about 10,000 to about 20 million and more.

Among the polymers suitable for the practice of the present invention are polyurethane elastomers having units of the formula with for example 4–20 carbon atoms (preferably aromatic), $R^3$ is a divalent organic radical with for example 2–20 carbon atoms (preferably alkylene), $R^4$ is hydrogen or an organic radical such as aromatic or alkyl (preferably lower alkyl), A is a member selected from the group consisting of

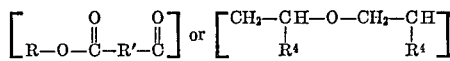

and $n$ is an integer of from 3 to 500. The units of the formula given above are recurring, $m$ being typically in the range of from about 40 to about 20,000. When the units are recurring, the symbols in the various recurring units do not necessarily stand for the same thing in all the recurring units.

The polyurethane elastomers of the above formula and their preparation are known to the art, for example, from the article by S. B. Clough and N. S. Schneider, "Journal Macromolecular Science, Physics" $B_2$ (4) p. 554 (December 1968). The polyurethane elastomers are prepared conveniently by capping a polyester or a polyether with a diisocyanate and then extending the polymer with a glycol. The polyester can be prepared, for example, from a diol (preferably an aliphatic diol containing 2–20 carbon atoms) such as butanediol, hexanediol, and dodecanediol and a dibasic acid (preferably an aliphatic dibasic acid containing 3–20 carbon atoms) such as adipic acid and sebacic acid. The polyether (preferably 2–12 carbon atoms) can be, for example, polybutylene oxide, polypropylene oxide and polyethylene oxide. The diisocyanates typically contain 4–20 carbon atoms. Examples include 2,4-tolylene diisocyanate, 65–35 tolylene diisocyanate, 80/20 tolylene diisocyanate, 4,4'-diphenylmethane diisocyanate, tolidine diisocyanate, hexamethylene diisocyanate, m-xylene diisocyanate and dianisidine diisocyanate. The extending glycol typically contains 2–20 carbon (preferably alkylene glycols). Examples include butylene, propylene and ethylene glycol.

The membrane may be a simple disk or sheet of a membrane substance which is suitably mounted in a duct or pipe or mounted in a plate and frame filter press. Other forms of the membrane also may be employed such as hollow tubes and fibers through which or around which a feed is supplied or recirculated with the product being removed at the other side of the tube as a vapor. Various other shapes and sizes are readily adaptable to commercial installations. The membrane, of course, must be insoluble in the organic medium to be separated. "Membrane insolubility" as used herein is taken to include that the membrane material is not substantially solution-swellable or sufficiently weakened by its presence in the solution to impart "rubbery" characteristics which can cause creep and rupture under the conditions of use including high pressures.

The art of membrane usage is well known with substantial literature being available on membrane support, fluid flow and the like. The present invention is practiced with such conventional procedures and apparatus. The membrane, of course, must be sufficiently thin to permit permeation as desired, but sufficiently thick so as to not rupture under pressure conditions employed. Typically, suitable membranes have a thickness of from about ½ to about 25 mils.

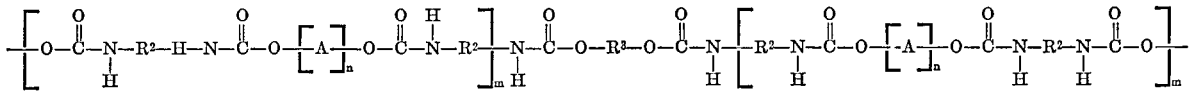

wherein R is a divalent organic radical with for example 2–20 carbon atoms (preferably alkylene), $R^1$ is a divalent organic radical with for example 3–20 carbon atoms (preferably alkylene), $R^2$ is a divalent organic radical The membrane may be prepared by any suitable procedure such as for example by casting a film or spinning a hollow fiber from a "dope" containing polymer and solvent. Such preparations are well known in the art.

The following examples illustrate specific embodiments of the present invention. In the invention, the membranes employed were in the form of film disks and were mounted in a membrane holder. The membranes varied in thickness from 5 to 20 mils.

EXAMPLE 1

Membrane permeations were conducted for the purpose of separating styrene from an organic liquid consisting of 70 wt. percent styrene and 30 wt. percent ethylbenzene using polyurethane elastomers containing polyester and polyether groupings. Separations were carried out under pervaporation permeation conditions at approximately 22° C. In each run preferential permeation of styrene was effected. In each run the pressure on the liquid side was amtospheric and the pressure on the vapor side was 0.1 mm. Hg. The results are shown in the table.

EXAMPLE 2

The procedure of Example 1 is followed to separate styrene from a mixture comprising styrene and ethylbenzene using a urethane based on poly(hexamethylene diol sebacate) capped with 2,4-tolylene diisocyanate and extended with propylene glycol.

While the invention has been described with reference to particular embodiments thereof, it will be appreciated that modifications and variations are possible without departing from the invention.

TABLE

| Run No. | Membrane | Rate ×10⁴ grams/hour/ 11.3 cm.²/mil of membrane | Separation factor |
|---|---|---|---|
| 1 | Urethane based on poly(butanediol adipate).ᵃ | 3,800 | 1.41 |
| 2 | Urethane based on poly(butylene oxide).ᵃ | 1,085 | 1.23 |
| 3 | Urethane based on poly(propylene oxide).ᵃ | 695 | 1.24 |
| 4 | Urethane based on poly(ethylene oxide).ᵃ | 90 | 1.68 |

ᵃ Prepared by reaction with diphenylmethane diisocyanate followed by extension with butanediol.

What is claimed is:

1. A process of the separation of styrene from an organic feed mixture comprising styrene and ethylbenzene which comprises contacting the said feed mixture against one side of the membrane comprising high molecular weight polyurethane elastomer, said polyurethane containing a grouping selected from the group consisting of polyester and polyether and withdrawing at the second side of the membrane a vaporous mixture having a higher concentration of styrene than the aforesaid feed mixture with the mixture at the second side being maintained at a lower chemical potential than the mixture on the other side of the membrane.

2. The process of claim 1 wherein the pressure on the second side of the membrane is less than atmospheric pressure and lower than the pressure on the other side of the membrane.

3. The process of claim 1 wherein the organic mixture is a liquid mixture.

4. The process of claim 1 wherein the membrane comprises a high molecular weight polyurethane elastomer of the formula

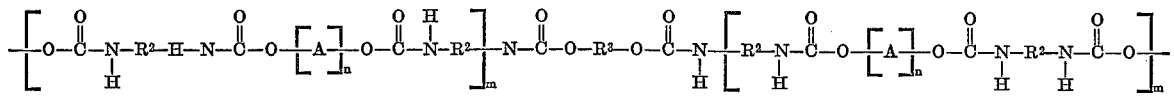

where R is a divalent organic radical having from 2 to 20 carbon atoms, $R^1$ is a divalent organic radical having from 3 to 20 carbon atoms, $R^2$ is a divalent organic radical having from 4 to 20 carbon atoms, $R^3$ is an organic divalent radical having from 2 to 20 carbon atoms, $R^4$ is a member selected from the group consisting of hydrogen and an organic radical having from 1 to 12 carbon atoms, $n$ is an integer of from 3 to 500 and A is selected from the group consisting of

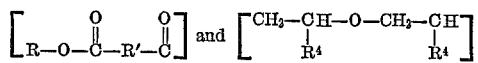

5. The process of claim 4 wherein A is

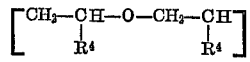

6. The process of claim 4 wherein A is

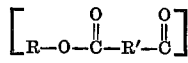

References Cited

UNITED STATES PATENTS

| 2,970,106 | 1/1961 | Binning et al. | 260—674 R |
| 3,228,876 | 1/1966 | Mahon | 260—674 R |
| 3,226,934 | 4/1973 | Strazik et al. | 260—669 A |

CURTIS R. DAVIS, Primary Examiner

U.S. Cl. X.R.

260—674 R